UNITED STATES PATENT OFFICE.

GEORGE WALKER, OF JERSEY CITY, NEW JERSEY.

PAINT.

SPECIFICATION forming part of Letters Patent No. 451,297, dated April 28, 1891.

Application filed August 16, 1890. Serial No. 362,228. (No specimens.)

*To all whom it may concern:*

Be it known that I, GEORGE WALKER, of Jersey City, in the county of Hudson and State of New Jersey, have invented a new and Improved Paint, of which the following is a full, clear, and exact description.

This invention consists of a paint made from wood-tar, substantially as hereinafter described, and more particularly pointed out in the claim.

I take, for instance, the tar obtained by the destructive distillation of wood, preferably hard wood, and separately distill it. The liquid products of this separate distillation of the wood-tar are of two kinds, separate from each other, to wit: The one first coming over is a light oil and acid water and the other afterward coming over is a heavy oil and acid water. The first of these—that is, the light oil which floats on water—is the first ingredient of my improved paint, and which I reserve for mixture with the other ingredient thereof that is obtained as follows: I continue the distillation of the wood-tar from which the light oil has been removed until twenty, thirty, forty, or fifty per cent. (more or less) of the volatile products of it have passed over or been eliminated. This leaves a residuum, which is a glossy black substance resembling asphaltum and solid when cold. Such residuum constitutes the second ingredient of my paint, and may be termed "wood asphalt" or "pitch" and to produce my paint I thoroughly dissolve the asphalt by mixing therewith the hereinbefore-described light oil of the tar which constitutes the first ingredient. By the mixture of these two ingredients in any suitable proportions and with or without the aid of heat—namely, the light oil and the residuum of the distilled wood-tar from which the heavy oil has been largely or wholly volatilized or removed—I produce a valuable paint, which has an intensely black glossy surface, dries quickly, and is capable of resisting diluted acids and alkalies.

For a thick paint the proportions of the mixture may be fifteen gallons of the light oil to one hundred and thirty-seven pounds of the residuum, and for a thin paint twenty-five gallons of the light oil to one hundred and thirty-seven pounds of the residuum; but I do not restrict myself to any particular proportions, as these will necessarily vary with the required thickness or thinness of the paint to be produced.

This paint must not be confounded with a black varnish produced by mixing together a distillate of coal-tar, produced by distillation at a certain temperature, and the residuum left from a further distillation at a higher temperature, inasmuch as the two products have different properties and that obtained from the distillation of the wood-tar, as described, is superior to that obtained from the distillation of the coal-tar and can be used to greater advantage, especially when applied to resist chemical actions and where an offensive odor is objectionable.

Having thus described my invention, what I claim as new, and desire to secure by Letters Patent, is—

As a new article of manufacture, the within-described paint, composed of the following ingredients, namely: a light oil of distilled wood-tar and wood asphalt or pitch constituting the residuum of a further distillation of such tar.

GEORGE WALKER.

Witnesses:
A. GREGORY,
C. SEDGWICK.